Jan. 3, 1933.  H. F. GEORGE  1,892,780
COVERING MEANS
Filed Oct. 20, 1930
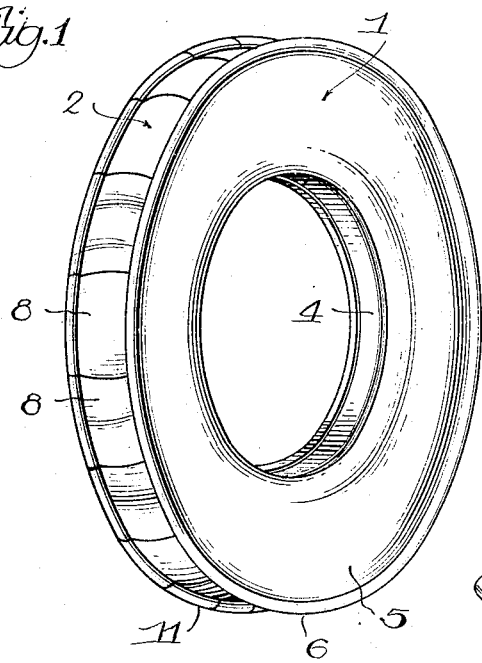
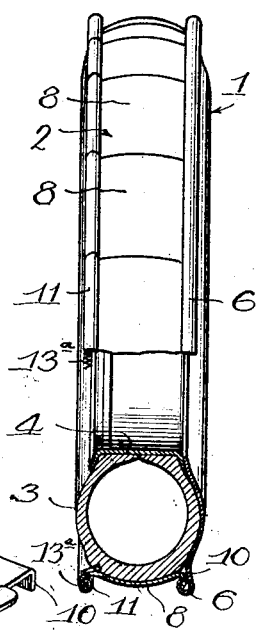
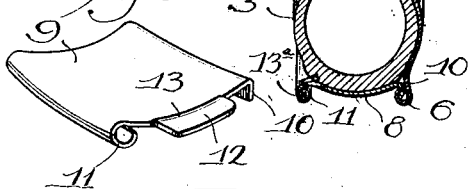
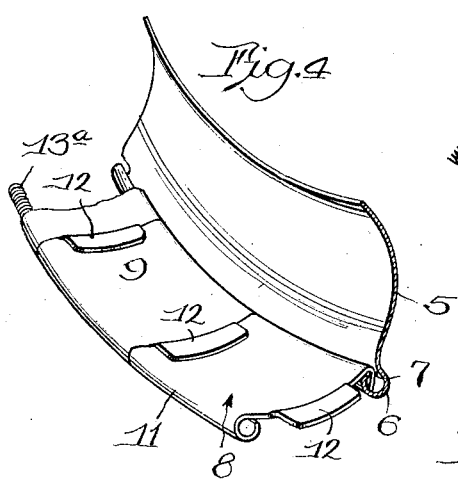
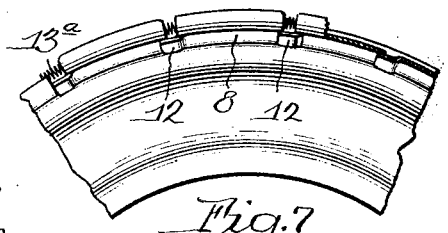
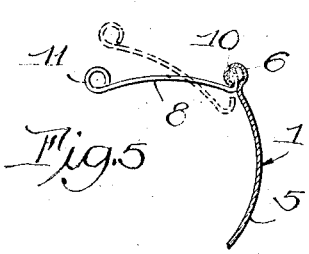
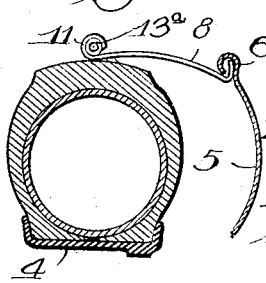
Inventor
Harry F. George
Wallace R. Lane
Atty.

Patented Jan. 3, 1933

1,892,780

UNITED STATES PATENT OFFICE

HARRY F. GEORGE, OF CHICAGO, ILLINOIS

COVERING MEANS

Application filed October 20, 1930. Serial No. 489,753.

The present invention relates to covering means, and more in particular to covers for automobile tires, and the like.

Among the objects of the present invention is to provide a novel covering means for articles, such as automobile tires or the like, which may be readily and easily applied to and removed from the article to be covered.

Another object of the invention is to provide a covering means having metal parts or members, each of which may be stamped or cut from a sheet of metal, and which may then be readily assembled to produce the finished product. These parts or members of the covering may be cut or stamped from any metal, but preferably a non-corrodible or other metal having a rust resisting surfacing applied thereto, and which likewise will take a high polish.

The invention comprehends the idea of providing a metal tire cover having a face portion adapted to cover the side of the tire, and a yieldable tread covering portion projecting laterally therefrom and being flexibly connected to the face portion whereby the yieldable tread covering portion may be slipped or pushed over the tread of the tire to cover the tread and to hold the entire cover in place.

The cover may likewise be readily and easily removed by pulling outwardly thereon, at which time the yieldably connected tread covering members will spread apart to permit the same to slide over the tread portion of the tire.

In an embodiment selected to illustrate the invention, the tire cover is shown as comprising a face portion having a diameter substantially equal to that of the tire to be covered, and to which is flexibly connected a plurality of laterally projecting tread covering members. These members are yieldably connected together by a coiled spring which permits the members to spread apart when the cover is being slipped on over the tread of the tire. When the cover is in place on the tire, this coiled spring brings the separated tread members together again to close the opening therebetween so as to effectively cover and protect the tread or top part of the tire. The yieldably connecting members grip the tread portion of the tire and rigidly hold the cover in place on the tire. In order to remove the cover from the tire, it is only necessary to apply a slight outward force to the cover, at which time the coiled spring connecting the tread members together will yield to permit the spreading apart of the tread members so that the cover may be removed from the tire.

Other objects, features, capabilities, and advantages are comprehended by the invention as will later appear, and as are inherently possessed thereby.

Referring to the drawing:

Fig. 1 is a view in perspective of the novel cover applied to an automobile tire.

Fig. 2 is an end view of the cover showing the same applied to an automobile tire and having parts broken away to disclose the tire and cover in cross section.

Fig. 3 is a view in perspective of one of the tread members.

Fig. 4 is a fragmentary view in perspective of the cover, disclosing the manner in which the same is assembled.

Fig. 5 is a cross sectional view through the cover disclosing in dotted lines the position of a tread member as the same is being connected to the face portion.

Fig. 6 is a fragmentary view in elevation of the rear of the cover, and having parts broken away to more clearly disclose in cross-section the construction and assembly of the tread members.

Fig. 7 is a view similar to Fig. 6 showing the yieldable tread portion in an expanded position.

Fig. 8 is a cross section of a tire, and disclosing the manner in which the present cover is applied thereto.

Referring now more in detail to the drawing, an embodiment selected to illustrate the invention is shown as comprising a face portion 1 and a tread portion 2, this tread portion 2 being slipped on or over a tire 3 mounted upon a demountable rim 4. The face portion is stamped or cut from a piece of sheet metal to provide an annular or ring shaped plate 5 having an outside diameter substantially equal to that of the tire to be covered, this plate being pressed or shaped to conform to the contour of the side of the tire 3, and to closely fit thereover. The outer edge of this plate 5 is rolled or turned to provide a hinge element comprising a bead 6 having an open groove or slot 7.

The tread portion 2 of the cover comprises a plurality of tread members 8, each of which has a curved body portion 9, the radius of curvature in a longitudinal and transverse direction being substantially equal to that of the tread portion of the tire to be covered. One of the edges of this body portion is bent or turned to provide a flanged hinge element 10, while the other edge opposite the hinge element is rolled or turned to form the tubular bead 11. A lip portion 12 projects from one side of the body portion 9 and is formed integral therewith, the same being crimped along the line 13 so that this slip portion is offset from the body portion a distance substantially equal to the thickness of the member.

In assembling the members of the present cover, the flanges 10 of the tread members 8 are inserted into the opening or groove 7 of the bead 6, as clearly shown in Fig. 5 of the drawing. When all of the tread members are in place except one, a coiled spring 13ᵃ is threaded through the aligned tubular bead 11 of the tread members. The coiled spring is then threaded through the bead of the last tread member, and the ends thereof fastened or secured together in any desired manner. This connection can be effected by backing up or compressing a portion of one end of the spring and then inserting the other end of the spring therein, and releasing the compressed end, at which time the coiled portions of the spring will interlock to secure the ends together, although it is to be understood that the ends of the spring may be secured together in any other suitable manner.

When the ends of the spring have been connected together, the last tread member may be inserted in place, and the cover is then ready to be applied to a tire. This coiled spring is of such a length and resiliency as to draw the edges of adjacent tread members into contacting engagement to close the opening between them, when the cover is placed over a tire so as to effectively cover the tread portions thereof and to prevent the passage of dust and dirt therethrough and onto the tire.

As clearly shown in Figs. 4, 6 and 7, the lip portion 12 of each of the tread members is overlapped by the edge of an adjacent tread member. This lip portion assists in holding each of the tread members in place, and likewise provides a suitable surface portion upon which the tread members may slide and be guided when the tread portion of the cover is expanded, as clearly shown in Fig. 7 of the drawing.

While I have herein described and upon the drawing shown an illustrative embodiment of the invention, it is to be understood that the invention is not limited thereto, but may comprehend other constructions, arrangements of parts, details and features without departing from the spirit of the invention.

Having thus disclosed the invention, I claim:

1. A tire cover comprising a face plate, a plurality of tread covering members flexibly connected to the edge of said plate and projecting laterally therefrom, each of said members having a lip portion overlapped by the edge of an adjacent member, each of said members having a beaded edge, and resilient means passing through the bead of said members for holding said members in position.

2. A tire cover comprising a metal face plate bent to conform to the shape of the side of a tire, said plate having a hinge element at its outer edge, a plurality of tread covering members having a hinge element at one edge thereof engaging with the hinge element of said plate, the edge of each of said members opposite said element being beaded, and resilient means extending through the bead of said members for yieldably securing said members together.

In witness whereof, I hereunto subscribe my name to this specification.

HARRY F. GEORGE.